(12) United States Patent
Sigurdsson

(10) Patent No.: US 9,494,140 B2
(45) Date of Patent: Nov. 15, 2016

(54) FRAME SUPPORT ASSEMBLY FOR TRANSPORTING WIND TURBINE BLADES

(71) Applicant: BNSF Logistics, LLC, Springdale, AR (US)

(72) Inventor: Sigurd Ernir Sigurdsson, Bothell, WA (US)

(73) Assignee: BNSF Logistics, LLC, Springdale, AZ (US)

( * ) Notice: Subject to any disclaimer, the term of this patent is extended or adjusted under 35 U.S.C. 154(b) by 68 days.

(21) Appl. No.: 14/595,288

(22) Filed: Jan. 13, 2015

(65) Prior Publication Data
US 2015/0198140 A1    Jul. 16, 2015

Related U.S. Application Data

(60) Provisional application No. 61/928,066, filed on Jan. 16, 2014.

(51) Int. Cl.
*F03D 1/06*      (2006.01)
*A47B 81/00*     (2006.01)
*F03D 1/00*      (2006.01)

(52) U.S. Cl.
CPC ............. *F03D 13/40* (2016.05); *A47B 81/00* (2013.01); *F03D 1/005* (2013.01); *Y02E 10/72* (2013.01)

(58) Field of Classification Search
CPC ........ E21B 19/15; F03D 1/003; F03D 1/005; F03D 13/40
USPC ...................... 211/60.1, 70.4, 70.5
See application file for complete search history.

(56) References Cited

U.S. PATENT DOCUMENTS 3,945,497 A * 3/1976 Greenberg ............. B65D 61/00
                                                    108/53.5
7,070,196 B1 * 7/2006 Larsen ...................... B63C 3/12
                                                    211/70.5
(Continued)

FOREIGN PATENT DOCUMENTS

EP    2239459 A2    10/2010
EP    2628945 A2    8/2013
(Continued)

OTHER PUBLICATIONS

International Search Report dated Jun. 1, 2015.
(Continued)

*Primary Examiner* — Michael Safavi
(74) *Attorney, Agent, or Firm* — Thompson & Knight LLP; James J. Murphy

(57) ABSTRACT

A system for transporting wind turbine blades includes a first support structure for supporting a cylindrical root section of a first wind turbine blade and a second support structure aligned with and spaced from the first support structure for supporting a tip section of the first wind turbine blade. A third support structure is included for supporting a tip section of a second wind turbine blade. A fourth support structure is spaced from and aligned with the third support structure for supporting a cylindrical root section of the second wind turbine blade. The first and second wind turbine blades extend with an edge-vertical orientation in opposing directions such that a tip of the first wind turbine blade is disposed horizontally adjacent the cylindrical root section of the second wind turbine blade and a tip of the second wind turbine blade is disposed horizontally adjacent the cylindrical root section of the first wind turbine blade.

27 Claims, 15 Drawing Sheets

(56) References Cited

U.S. PATENT DOCUMENTS

| | | | | |
|---|---|---|---|---|
| 2006/0251517 A1* | 11/2006 | Grabau | ............ | B60P 3/40 416/202 |
| 2007/0189895 A1* | 8/2007 | Kootstra | ............ | B60P 3/40 416/9 |
| 2007/0253829 A1* | 11/2007 | Wessel | ............ | F03D 1/005 416/244 R |
| 2009/0003957 A1* | 1/2009 | Llorente Gonzalez | | B65D 85/68 410/35 |
| 2010/0252977 A1* | 10/2010 | Jorgensen | ............ | F03D 1/005 269/287 |
| 2011/0142660 A1* | 6/2011 | Bakhuis | ............ | B60P 3/40 416/223 R |
| 2011/0308205 A1* | 12/2011 | Vitor | ............ | B65D 61/00 53/475 |
| 2012/0192420 A1* | 8/2012 | Krogh | ............ | F03D 1/005 29/889 |
| 2013/0119002 A1* | 5/2013 | Frederiksen | ............ | B60P 3/40 211/60.1 |
| 2013/0216325 A1* | 8/2013 | Johnson | ............ | F03D 1/005 410/44 |
| 2013/0270847 A1* | 10/2013 | Hagelskjaer | ............ | B65D 85/62 294/67.1 |
| 2013/0319891 A1* | 12/2013 | Lieberknecht | ............ | B65D 85/68 206/448 |
| 2014/0027395 A1* | 1/2014 | Benoit | ............ | B65D 88/129 211/70.4 |
| 2014/0314576 A1* | 10/2014 | Lieberknecht | ............ | F01D 5/32 416/220 R |
| 2015/0300314 A1* | 10/2015 | Van Der Zee | ............ | F16B 2/08 211/85.8 |
| 2016/0007738 A1* | 1/2016 | Garcia | ............ | E21B 19/15 211/182 |

FOREIGN PATENT DOCUMENTS

| | | | | |
|---|---|---|---|---|
| EP | 2669506 | * | 12/2013 | ............ F03D 1/00 |
| EP | 2669506 A1 | | 12/2013 | |
| WO | WO 2012143014 A1 | | 10/2012 | |

OTHER PUBLICATIONS

Written Opinion of the International Searching Authority dated Jun. 1, 2015.

* cited by examiner

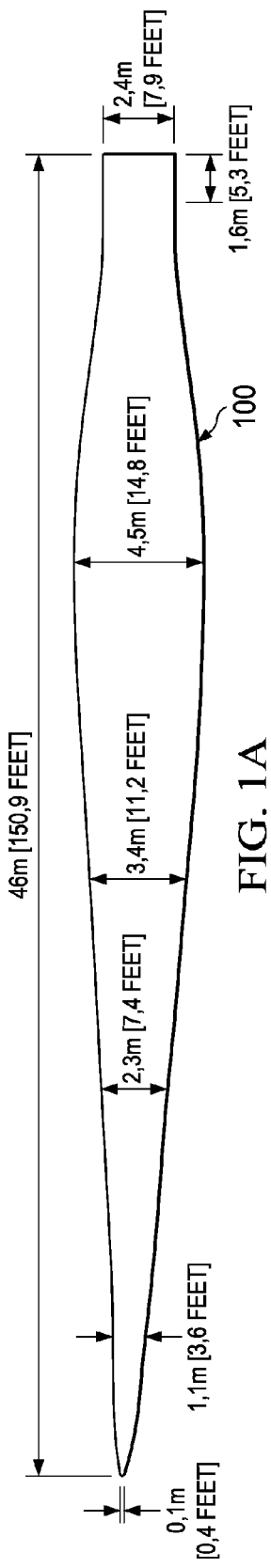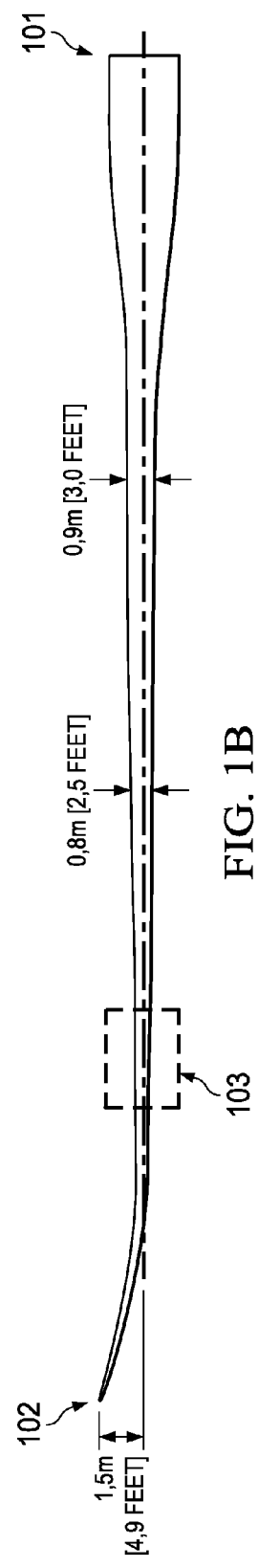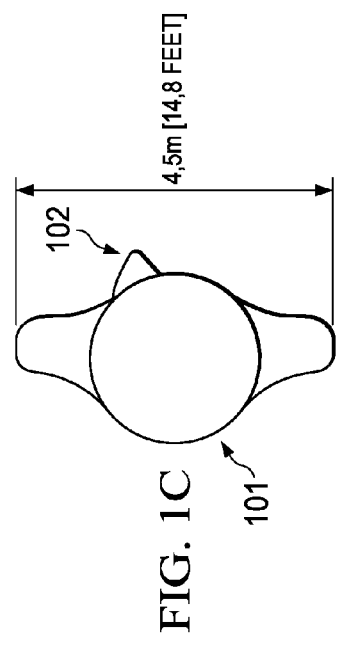
FIG. 1A
FIG. 1B
FIG. 1C

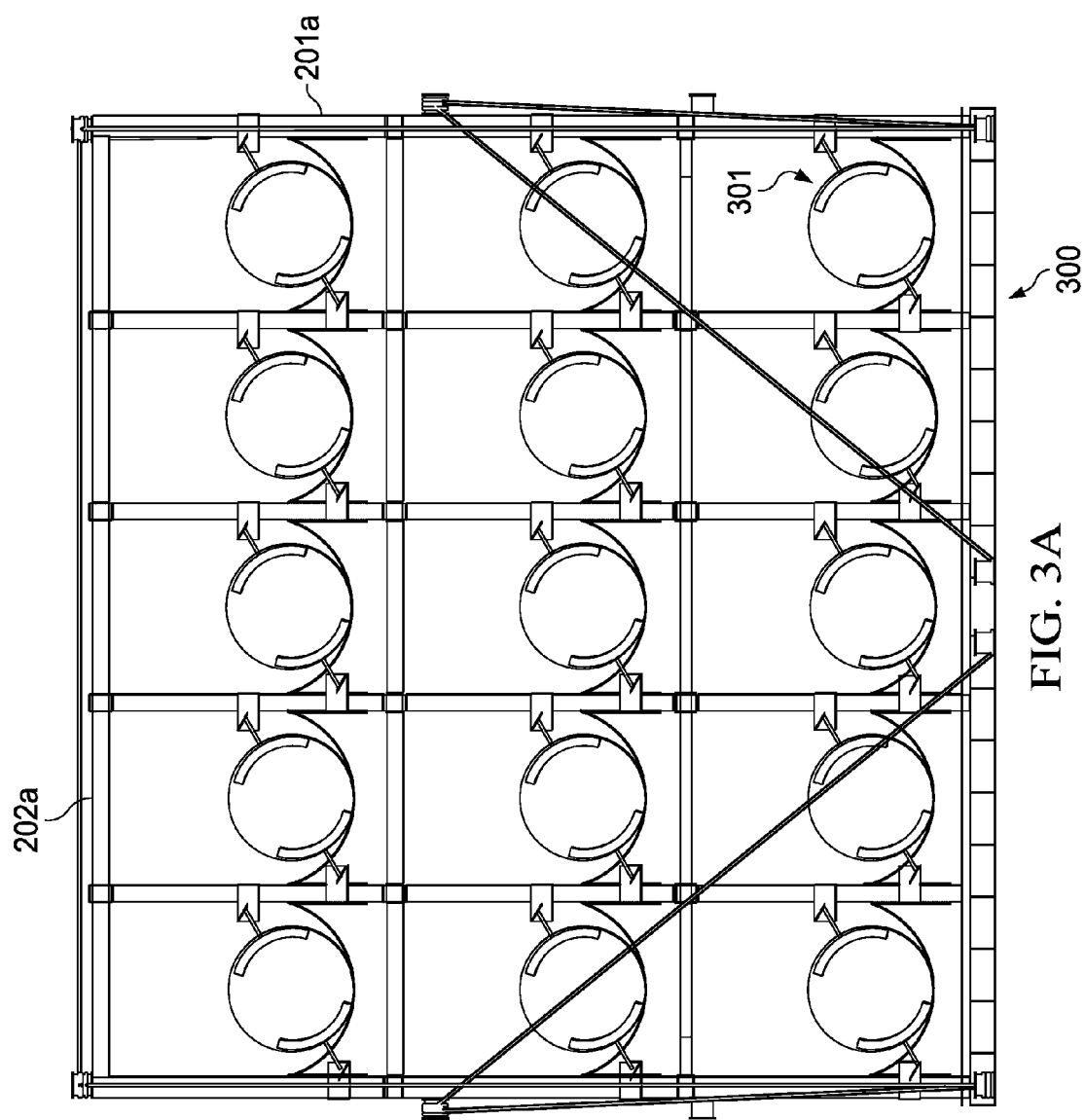

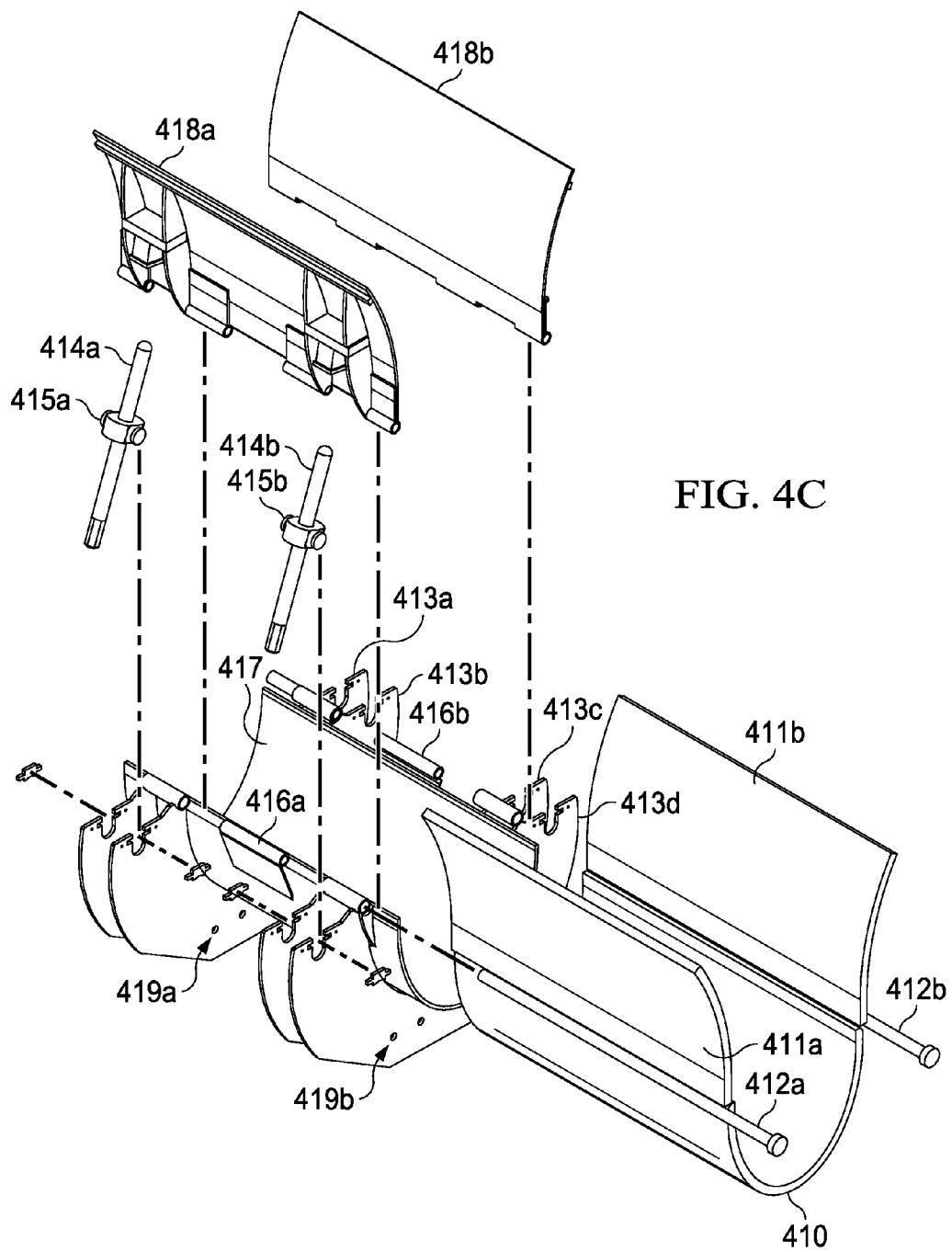

FRAME SUPPORT ASSEMBLY FOR TRANSPORTING WIND TURBINE BLADES

CROSS-REFERENCE TO RELATED APPLICATION

The present application claims the benefit of U.S. Provisional Application No. 61/928,066, filed Jan. 16, 2014 and incorporated herein by reference for all purposes.

FIELD OF INVENTION

The present invention relates in general to wind turbine blades, and in particular to systems and methods for transporting wind turbine blades.

BACKGROUND OF INVENTION

Wind turbines have become an important source of electrical power worldwide. Generally, wind turbines are supported by a tower and driven by multiple wind turbine blades, each of which is typically tens of meters in length. As efforts are made to increase the amount of electrical power generated per wind turbine, the length of the wind turbine blades has also correspondingly increased.

The significant length of currently available wind turbine blades, as well as the continuing efforts to design and manufacture even longer wind turbine blades, has presented substantial challenges for those tasked with transporting wind turbine blades from the manufacturer to the wind turbine farms. One particular challenging scenario is the transportation by ship.

Currently, the blade manufacturer typically bolts fixtures to the blade root and tip sections, which provide points for the blades to be lifted and moved without damage, as well as for securing the blades to ship decks and other transportation vehicles. Although these fixtures are usually designed and fabricated for reuse, in actual practice their components, including the bolts, are often lost or discarded at the wind turbine farms, which can result in a significant, and often avoidable, monetary loss to the wind turbine blade manufacturer.

The lifting of wind turbine blades on and off of ships, as well the process of securing the wind turbine blades to the ship decks, present a number of other problems. Among other things, in-port time and cost constraints require techniques for quickly and safely lifting the blades on and off of the ship, as well as for efficiently and effectively securing the blades to the ship decks for safe transit overseas.

Another factor is maximizing the number of wind turbine blades that can be carried per shipload. For example, in some circumstances, the blades are stacked in an edge-horizontal orientation to increase packing density; however, depending on the size of the ship, the loading applied during transport at sea can cause the horizontally-oriented bodies of the stacked blades to flex vertically, which can result in undue stress, contact between vertically adjacent blades, and blade damage.

SUMMARY OF INVENTION

The principles of the present invention are embodied in a system for transporting wind turbine blades, which includes a first support structure for supporting a cylindrical root section of a first wind turbine blade and a second support structure aligned with and spaced from the first support structure for supporting a tip section of the first wind turbine blade. A third support structure is included for supporting a tip section of a second wind turbine blade. A fourth support structure is spaced from and aligned with the third support structure for supporting a cylindrical root section of the second wind turbine blade. The first and second wind turbine blades extend with an edge-vertical orientation in opposing directions such that a tip of the first wind turbine blade is disposed horizontally adjacent the cylindrical root section of the second wind turbine blade and a tip of the second wind turbine blade is disposed horizontally adjacent the cylindrical root section of the first wind turbine blade.

Wind turbine blade transport systems embodying the present principles realize a number of substantial advantages over the prior art. Among other things, the fixtures typically used to transport wind turbine blades are no longer required, which reduces the unnecessary expenses that are often incurred at the wind farm work sites when fixture components are lost or discarded. Moreover, by packing the wind turbine blades edge-vertical, the effects of the forces typically incurred during ocean transport are minimized.

In addition, the stability provided by these transport system allows for a significant reduction in the number of chains, cables, and/or composite fiber lines required to secure the wind turbine blades to the deck of a ship or other transportation vehicle. Furthermore, the principles of the present invention provide for the modular construction of wind turbine transport packs of different configurations, as needed to transport wind turbine blades of varying lengths, differing numbers of wind turbine blades, and/or to meet constraints such as limits on available ship deck and/or hold space. Blade transport systems embodying the inventive principles, when not in use, can be disassembled for storage and transport in standard land-sea shipping containers.

BRIEF DESCRIPTION OF DRAWINGS

For a more complete understanding of the present invention, and the advantages thereof, reference is now made to the following descriptions taken in conjunction with the accompanying drawings, in which:

FIGS. 1A-1C are respectively top, side, and end views of a generic wind turbine blade suitable for describing the principles of the present invention (the dimensions shown provide a reference as to scale and relative proportions and may vary in actual practice);

FIG. 3A is an elevational view of one of the two substantially similar end frames of FIG. 2A, shown without the associated wind turbine blades installed within the wind turbine blade pack;

FIG. 4C is an exploded view of the wind turbine blade tip section support structure shown in FIG. 4A;

DETAILED DESCRIPTION OF THE INVENTION

The principles of the present invention and their advantages are best understood by referring to the illustrated embodiment depicted in FIGS. 1-4 of the drawings, in which like numbers designate like parts.

FIGS. 1A-1C are conceptual diagrams of a generic wind turbine blade 100 suitable for describing the principles of the present invention. Currently there are a number of wind turbine blade constructions used worldwide, although a typical wind turbine blade 100 will include a root with a cylindrical section 101 and skin panels or shells supported by the root, which extend to a blade tip 102 and provide the surfaces of the blade airfoil. Longitudinally extending bolts, discussed below, attach cylindrical section 101 to the rotor hub of the associated wind turbine. Each manufacture typically provides a reinforced blade tip section 103 for allowing wind turbine blade 100 to be secured, transported, and supported without damage to the outer shell or root.

Representative dimensions are shown in FIGS. 1A-1C to provide the reader with a sense of scale, although wind turbine blades of 75 meters or more are currently viable and the trend in the wind turbine industry is to use increasingly longer blades. (Generally, longer turbine blades, and increased airfoil surface area, allow for an increase in power output from the wind turbine.) Application of the principles of the present invention are generally not dependent on the particular configuration or dimensions of the wind turbine blade itself.

Figure 2A:
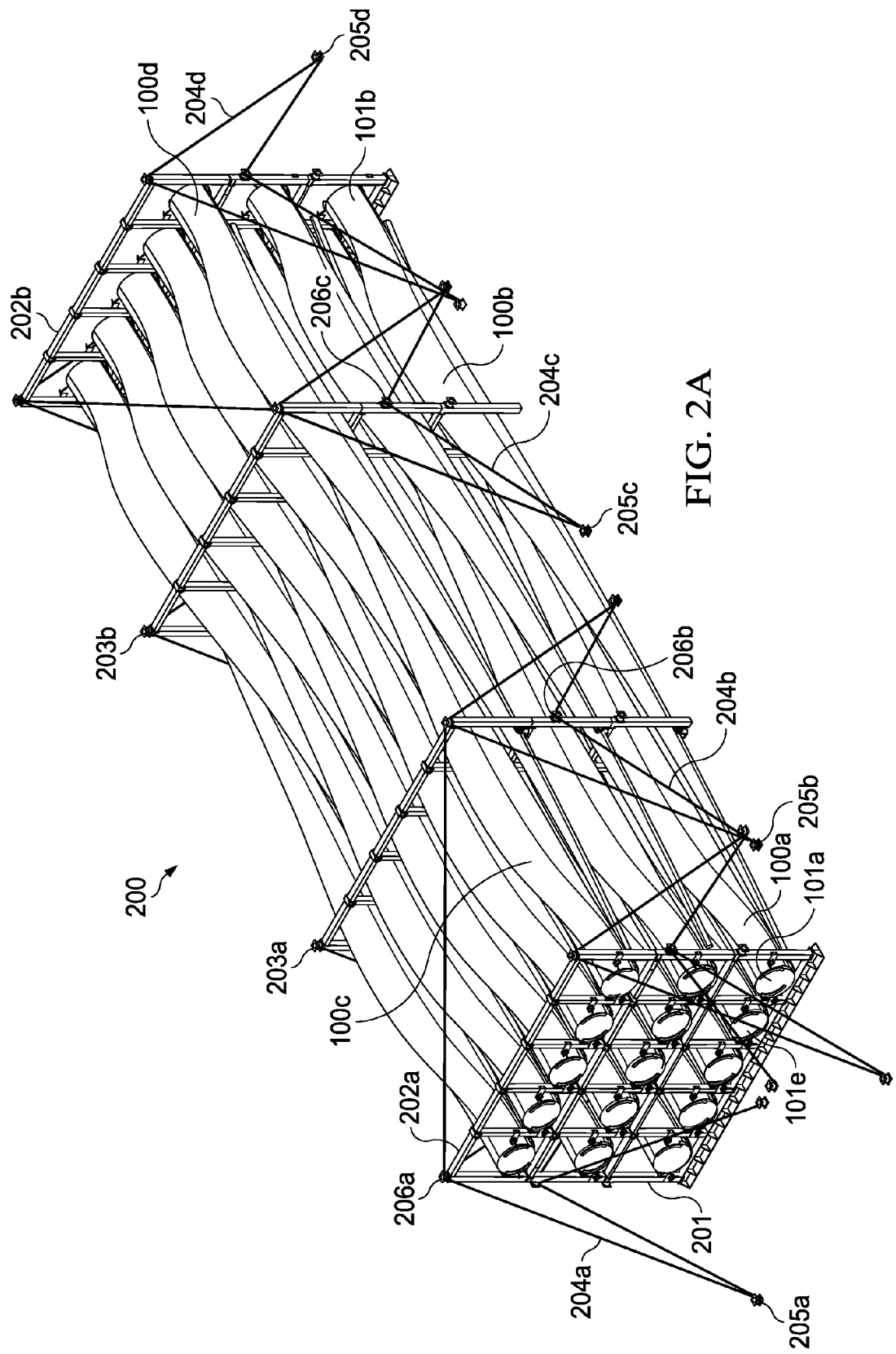
FIG. 2A is a top perspective view of a representative wind turbine blade pack embodying the principles of the present invention, as loaded with wind turbine blades similar to those shown in FIGS. 1A-1C.
Figure 2B:
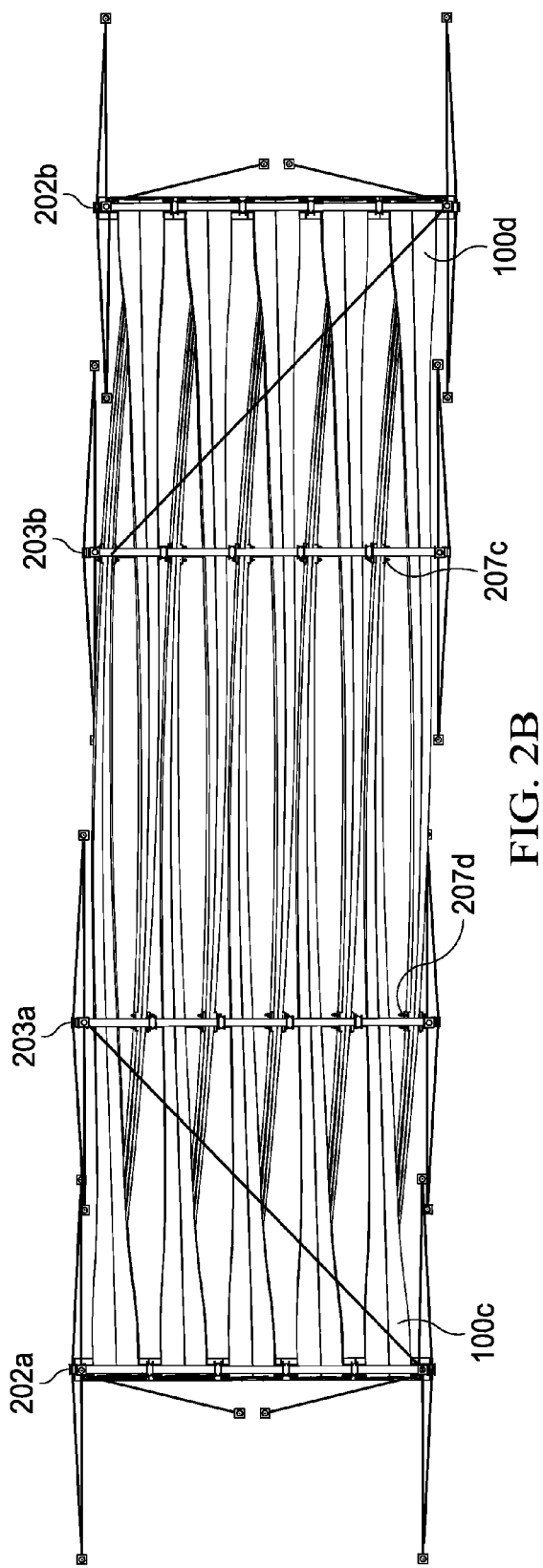
FIG. 2B is a top plan view of the loaded wind turbine blade pack shown in FIG. 2A.

FIG. 2A provides a top perspective view of a representative loaded wind turbine blade pack 200 embodying the principles of the present invention. Wind turbine blade pack 200 is most advantageously used for the securing a set of wind turbine blades during transport by ship, although other applications are possible. In the following discussion, wind turbine blade pack 200 is being used on a ship deck, which could by an upper (open) ship deck or a deck within a ship's hold. As discussed below, the modular construction of wind turbine pack 200 provides flexibility such that wind turbine pack 200 may be used in circumstances where the available deck or hold space differs.

In the illustrated embodiment, end frames 202a-202b and middle frames 203a-203b each define four (4) longitudinally aligned 5×3 arrays of rectangular subframes 201, which are shown fully loaded with thirty (30) wind turbine blades 100. Each set of four longitudinally subframes 201 supports and secures a pair of wind turbine blades, which are disposed root-to-tip with the airfoil edges extending vertically within the subframes 201, as shown in detail in FIG. 2B. Advantageously, edge-vertical packing according to the principles of the present invention provides increased blade support in light of the forces applied during typical ship borne transit, minimizes blade flexing, and reduces the probability of cracked or damaged blade shells.

While FIG. 2A shows a configuration of wind turbine pack 200 comprising four 5×3 aligned arrays of subframes 201, the modular construction of wind turbine pack 200 generally allows end frames 202a-202b and middle frames 203a-203b to define arrays of subframes 201 having m number of horizontal rows and n number of vertical columns for securing up to m×n×2 number of wind turbine blades 100. For example, in the smallest configuration, end frames 202a-202b and middle frames 203a-203b define four single longitudinally aligned subframes 201 for transporting and securing one or two wind turbine blades 100. Similarly, 2×2 aligned arrays of subframes 201 will accommodate up to eight (8) wind turbine blades, 5×1 aligned arrays of subframes 201 will accommodate up to ten (10) wind turbine blades, and so on. Advantageously, wind turbine pack 200 can be customized depending on the number of wind turbine blades being transported, any limitations on ship deck or hold space, and similar factors.

Wind turbine blade pack 200 is secured and stabilized by a series of conventional maritime fasteners 204, such as chains, cables, or composite fiber lines, which extend from fastening points 205 on the ship deck to fastening points 206 on end frames 202a-202b and middle frames 203a-203b. While four exemplary fasteners 204a-204d, along with the associated fastening points 205a-205d and 206a-206d are indicated for reference, in actual practice the number of fastening devices 204 used may vary significantly, as necessary to secure the loaded wind turbine blade pack 200 to the ship deck. In a typical application 100 or more fasteners may be required to secure a loaded turbine blade pack 200 the ship deck; however, because wind turbine blade pack 200 provides significant support and stability to wind turbine blades 100, the number of fasteners 204 required may be substantially reduced in view of existing methods of securing wind turbine blades to ship decks, which typically may require 300 or more similar fasteners. In addition, by providing fixed attachment fastening points 205 on wind turbine pack 200, interference between the wind turbine blades 100 and fasteners 204 is minimized.

Figure 2C:
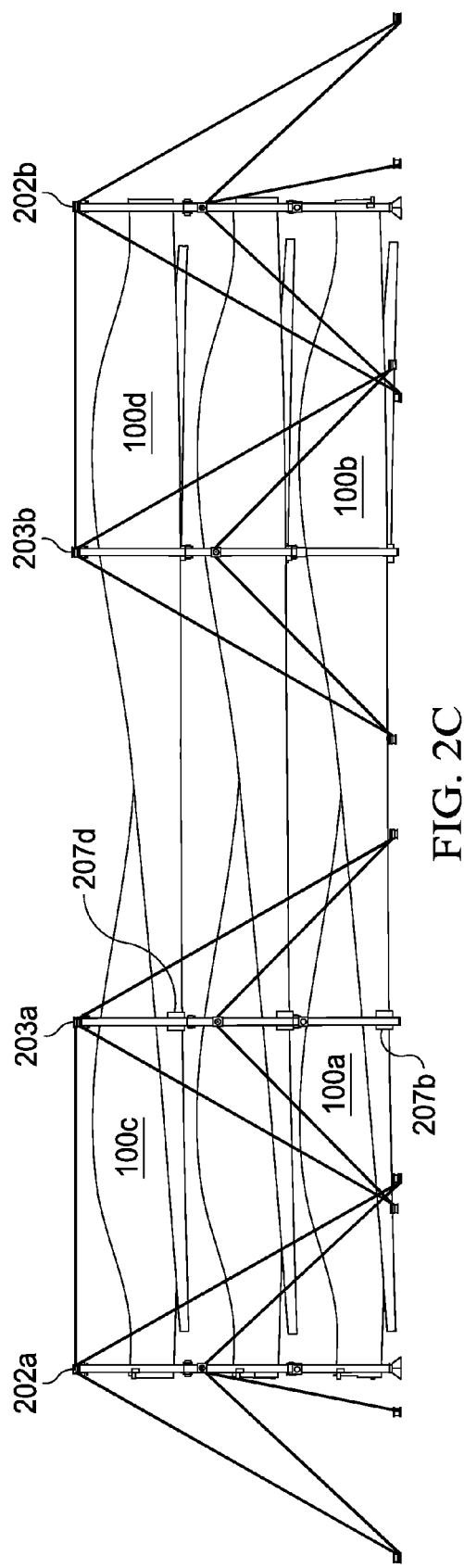
FIG. 2C is a side elevational view of the loaded wind turbine blade pack shown in FIG. 2A
Figure 2D:
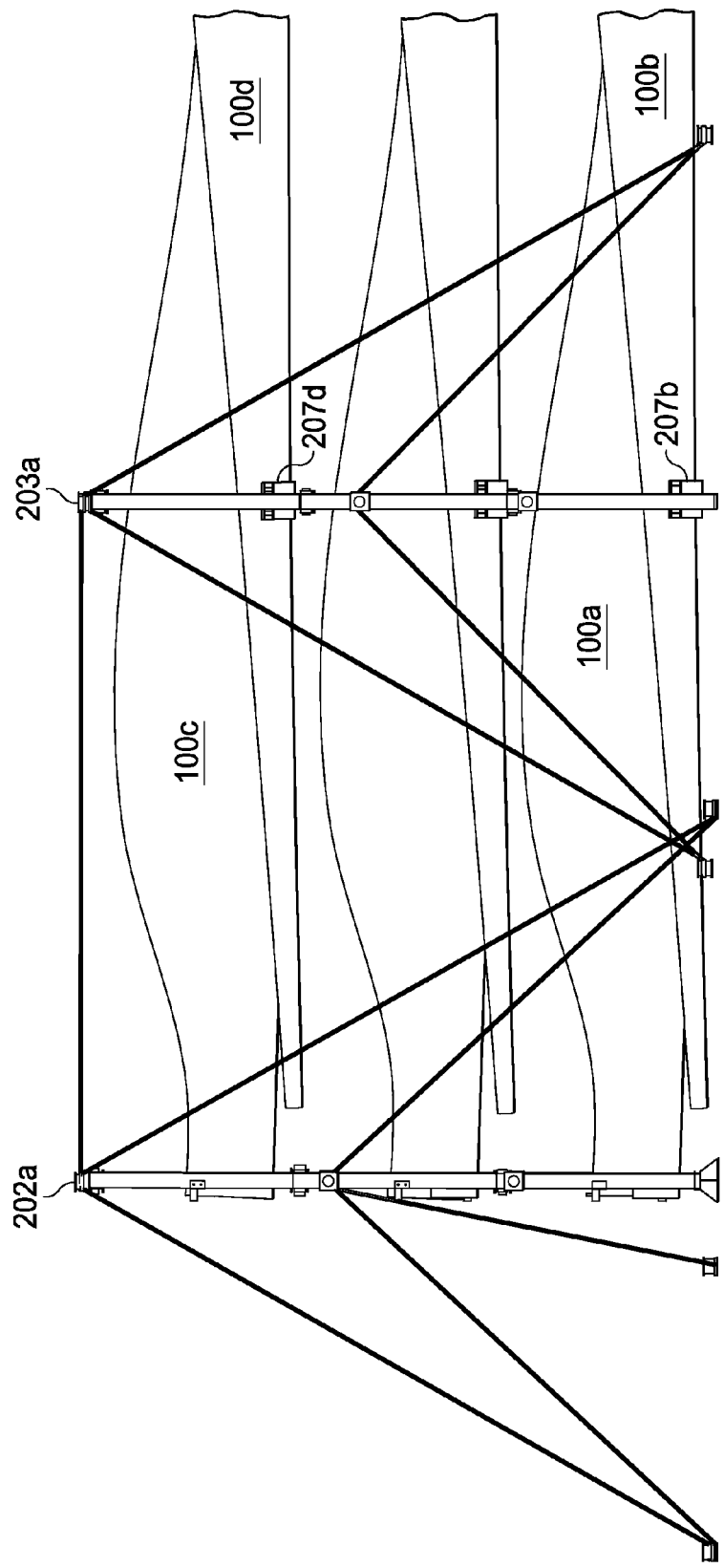
FIG. 2D is a partial side elevational view showing in further detail the root-to-tip interleaving of adjacent wind turbine blades loaded into the wind turbine blade pack of FIG. 2A.

FIG. 2C is a side elevational view showing the packing of wind turbine blades 100 in wind turbine blade pack 200. FIG. 2D shows one end of packed wind turbine blade pack 200 in further detail. The reinforced tip section 103 of each blade 100 is supported by a blade tip support assembly ("taco") 207 and the corresponding cylindrical root section 101 is supported by a blade root support assembly ("saddle") 301, discussed below in conjunction with FIGS. 3A-3D. For example, blade tip support assembly 207b supports the reinforced tip section 103 of wind turbine blade 100b, blade tip support assembly 207c and blade tip support assembly 207d supports the reinforced tip section 103 of wind turbine blade 100d. The spacing of end frame sections 202a-202b and middle frame sections 203a-203b will therefore depend on the length of the wind turbine blades 100 being secured, as well as the location of reinforced blade sections 103. Advantageously, the modular construction of wind turbine blade pack 200 allows the spacing between end frames 202a-202b and middle frames 203a-203b to be set to accommodate wind turbine blades of different lengths and with reinforced sections in different locations.

Blade tip support assemblies 207 are discussed in further detail below in conjunction with FIGS. 4A-4E. However, generally, each blade tip support assembly 207 includes a U-shaped receptacle for receiving the blade edge in reinforced tip section 103 of the corresponding wind turbine blade 100. A pair of opposing flaps contract onto the opposing blade outer surfaces to secure and stabilize the wind turbine blade tip section.

Figure 2E:
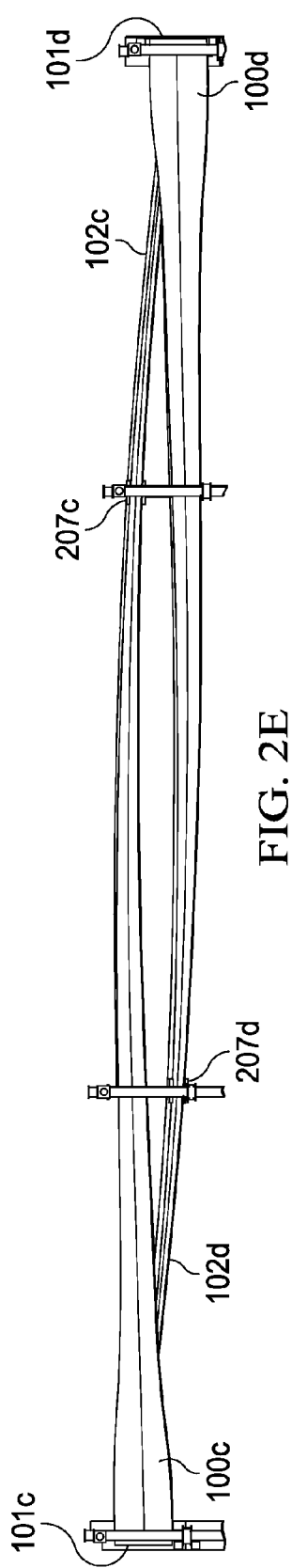
FIG. 2E is a top plan view illustrating the root-to-tip interleaving of a representative pair of horizontally adjacent wind turbine blades loaded into the wind turbine blade pack of FIG. 2A.

The interleaving (packing) of a representative pair of wind turbine blades 100, in this example wind turbine blades 100c and 100d, within wind turbine blade pack 200 is shown in further detail in the top plan view of FIG. 2E. The blade root support assembly (saddle) 301 elevates the cylindrical root section 101 of each pair of horizontally interleaved pair of wind turbine blades with respect to the tip 102 of the opposing blade of the pair. Hence, the curved tip section 102 (see FIG. 1B) of one blade curls underneath the cylindrical root section 101 of the other. The curling of the tip of one blade under the cylindrical root section of the other, in addition to the edge-vertical orientation, helps reduce the horizontal distance required to pack each pair of blades.

FIG. 3A is an end elevation view of end frame 202a, which is shown without installed wind turbine blades 100 for clarity. The configuration of opposing end frame 202b is similar.

Each end frame 202 is supported on the ship deck by a bottom beam 300, which is preferably fabricated from steel. In one embodiment, each bottom beam 300 is received within a shoe on the ship deck (not shown), although bottom beams 300 may also be fastened to the ship deck by welding, bolts, brazing, or other similar conventional techniques. Preferably, bottom beams 300 of end frames 202 are wider than the bottom beams of middle frames 203, discussed below. Each subframe 201 of each end frame 202 includes a blade root support assembly 301 ("saddle"), which supports and stabilizes the cylindrical root section 101 of a corresponding wind turbine blade 100.

Figure 3B:
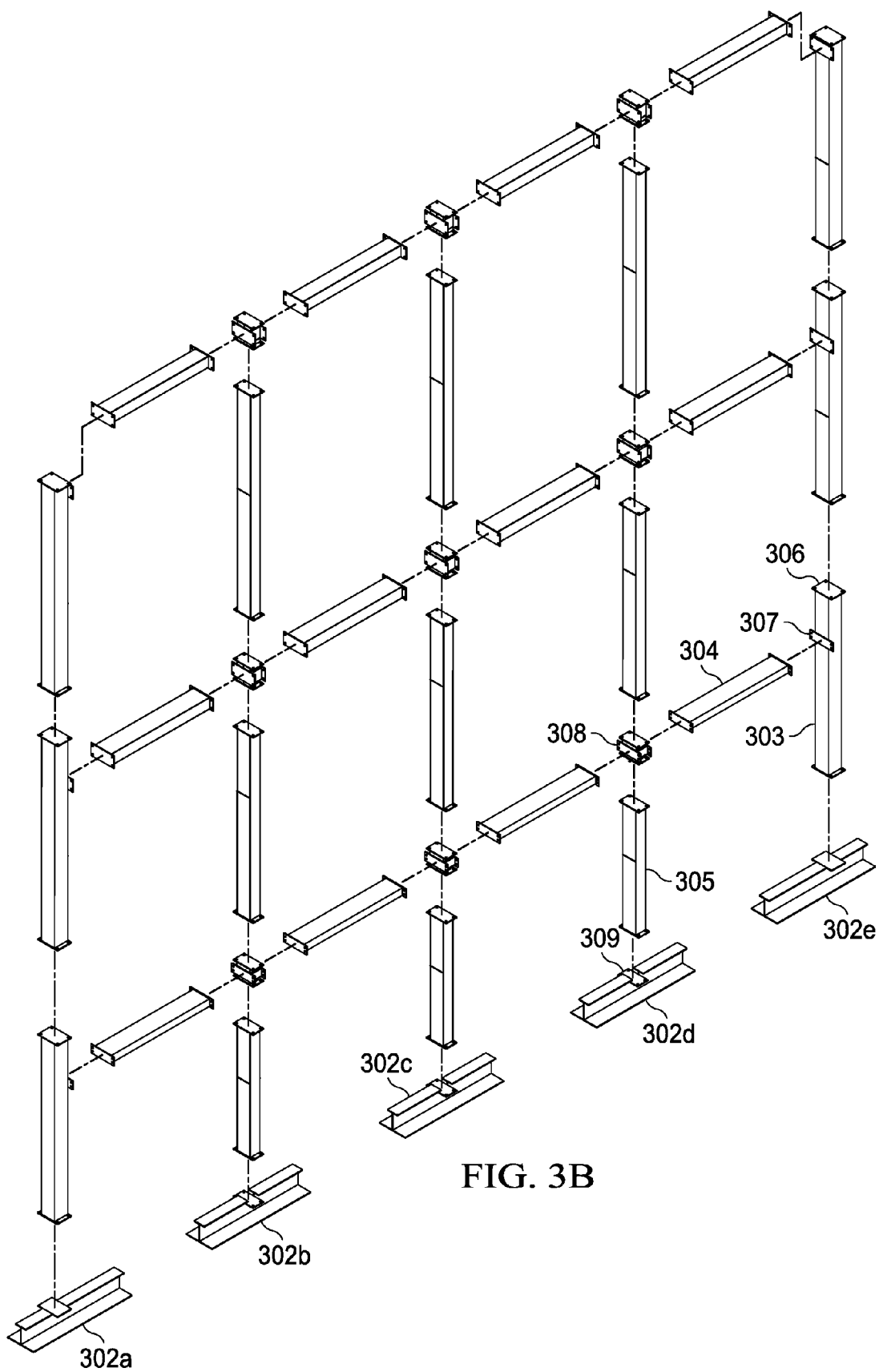
FIG. 3B is an exploded view of the end frames shown in FIG. 3A.

An exploded view of one end frame 202 is shown in FIG. 3B. The array of subframes 201 of each end frame 202 is constructed from a set of outer vertical beams 303, horizontal beams 304, and interior vertical beams 305. Vertical beams 303 and 305 and horizontal beams 303 are preferably fabricated from steel.

Outer vertical beams 303 form columns defining the lateral edges of the given end frame 202. Interior vertical beams 305 are shared by horizontally adjacent subframes 201. Horizontal beams define the top and bottom vertically adjacent subframes 201.

Outer vertical beams of vertically adjacent subframes 201 bolt together at plates 306 and with the associated horizontal beams 304 at plates 307. Interior vertical beams 305 of vertically adjacent subframes 201 are bolted together, along with the adjacent horizontal beams 304, at steel crosses 308.

Preferably, bottom beam 300 of each end frame 202 is formed from multiple steel sections 302a-302e, which are fastened together using conventional techniques such as welding or brazing. Outer vertical steel beams 303 and interior vertical steel beams 304 are preferably bolted to plates 309 disposed in slots in bottom beam 300.

In the preferred embodiment of end frames 202, the various structures forming the assembly (e.g., outer vertical beams 303, horizontal beams 304, and inner vertical beams 305) are fastened together with bolts or similar removal fastening devices, which advantageously allows end frames 202 to be quickly assembled and disassembled for use, movement, and storage. In alternate embodiments, end frames 202 may also be assembled using other techniques such as welding, brazing, or the like.

Figure 3C:
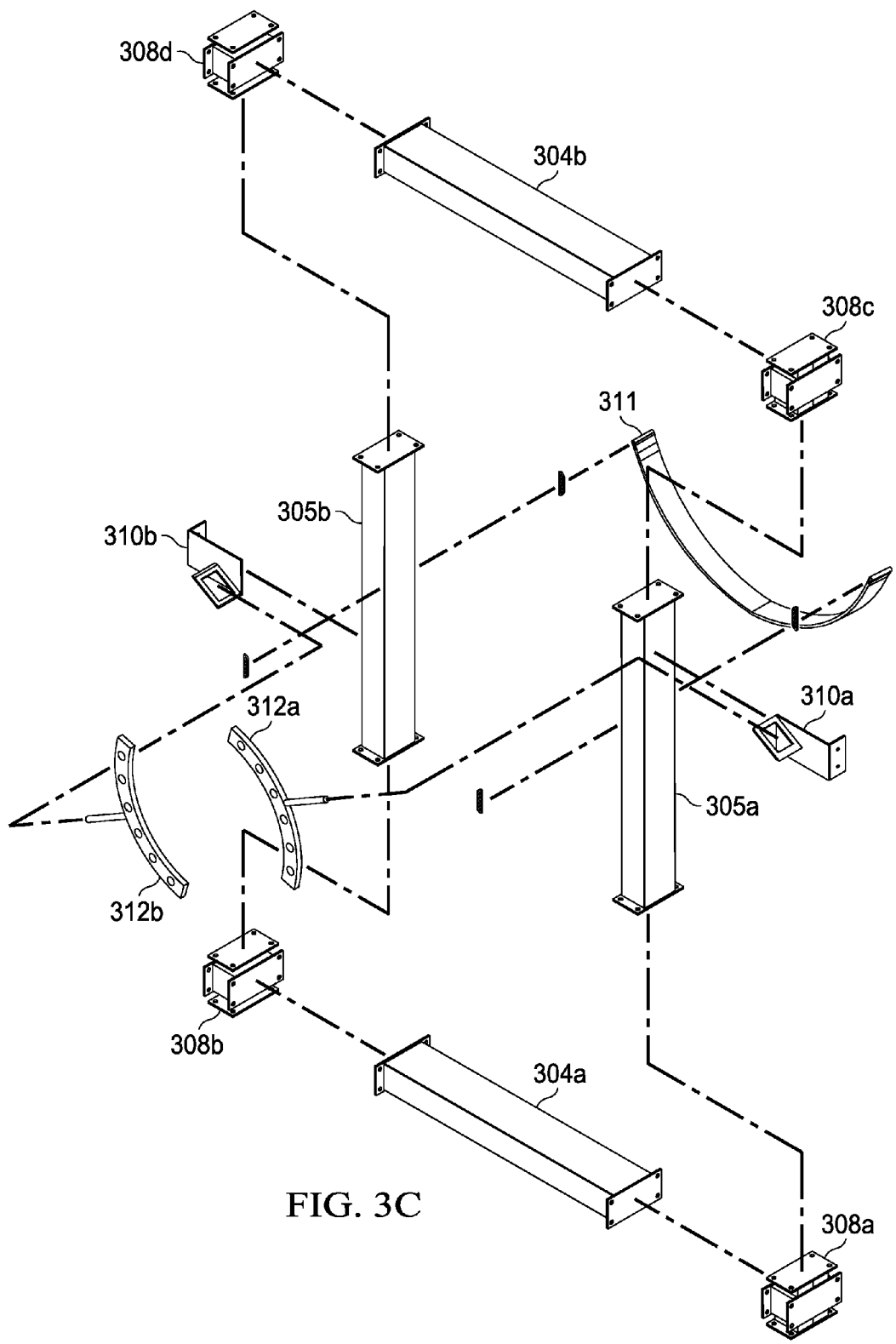
FIG. 3C is an exploded view of one of the wind turbine blade root support assemblies shown in FIG. 3A.

An exemplary blade root support assembly (saddle) 301 is shown in further detail in the exploded view of FIG. 3C. Blade root support assemblies 301 in the array of subframes 201 of each end frame 202a-202b are similar.

In this example, blade root support assembly 301 is supported by a pair of interior vertical steel beams 305a and 305b and a pair of horizontal steel beams 304a and 304b, discussed above in conjunction with FIG. 3B. A pair of opposing strap support assemblies 310a-310b support and adjust the length of a conventional flexible strap 311. When wind turbine blade pack 200 is loaded, strap 311 lies underneath and supports the cylindrical root section 101 of the associated wind turbine blade 100.

Figure 3D:
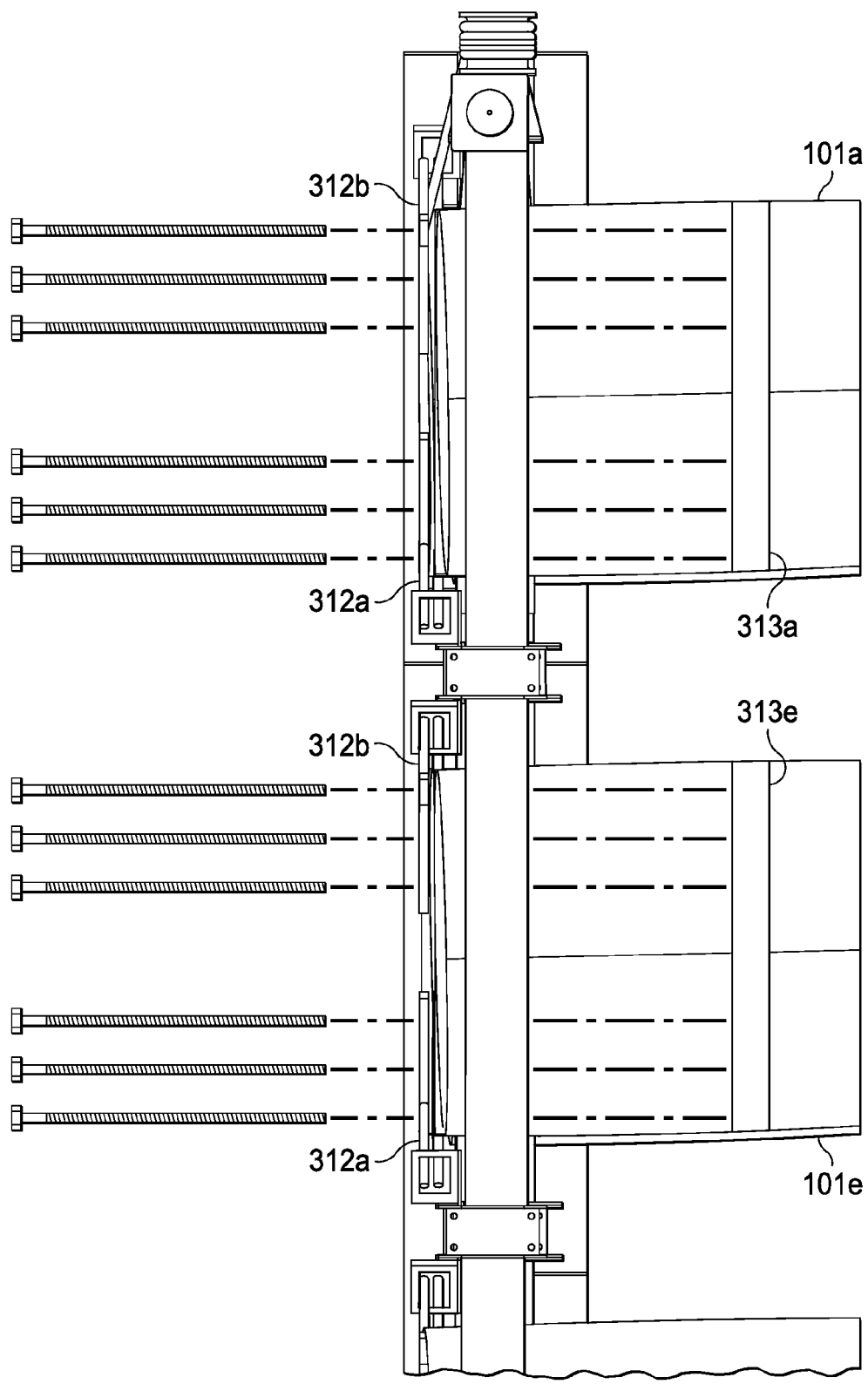
FIG. 3D is a top plan view showing in detail the cylindrical ends of a pair of horizontally adjacent wind turbine blades supported by corresponding blade root support assemblies, as shown in FIG. 3C, and the corresponding end frame shown in FIG. 3A.

Ears 312a-312b include apertures for receiving bolts that thread into the end of the cylindrical root section 101 of the associated wind turbine blade, as shown in FIG. 3D. (These bolts also fasten the wind turbine blade to the hub of the wind turbine, as known in the art).

FIG. 3D is a top plan view showing exemplary cylindrical root sections 101a and 101e of a pair of exemplary horizontally adjacent wind turbine blades 101a and 101e within loaded wind turbine blade pack 200 of FIG. 2A (see FIG. 1A). As shown in FIG. 3D, a second flexible strap 313 extends around the periphery of each cylindrical root section 101 and attaches to either end frame bottom beam 300, in the case of the lowest row in the array of subframes 201, or horizontal steel beam 304 disposed immediately below, in the case of rows in the array of subframes 201 above the bottom row. In the example of FIG. 3D, straps 313a and 313e respectively secure and stabilize the cylindrical root sections 101a and 101e of wind turbine blades 101a and 101e of FIG. 2A.

Figure 4A:
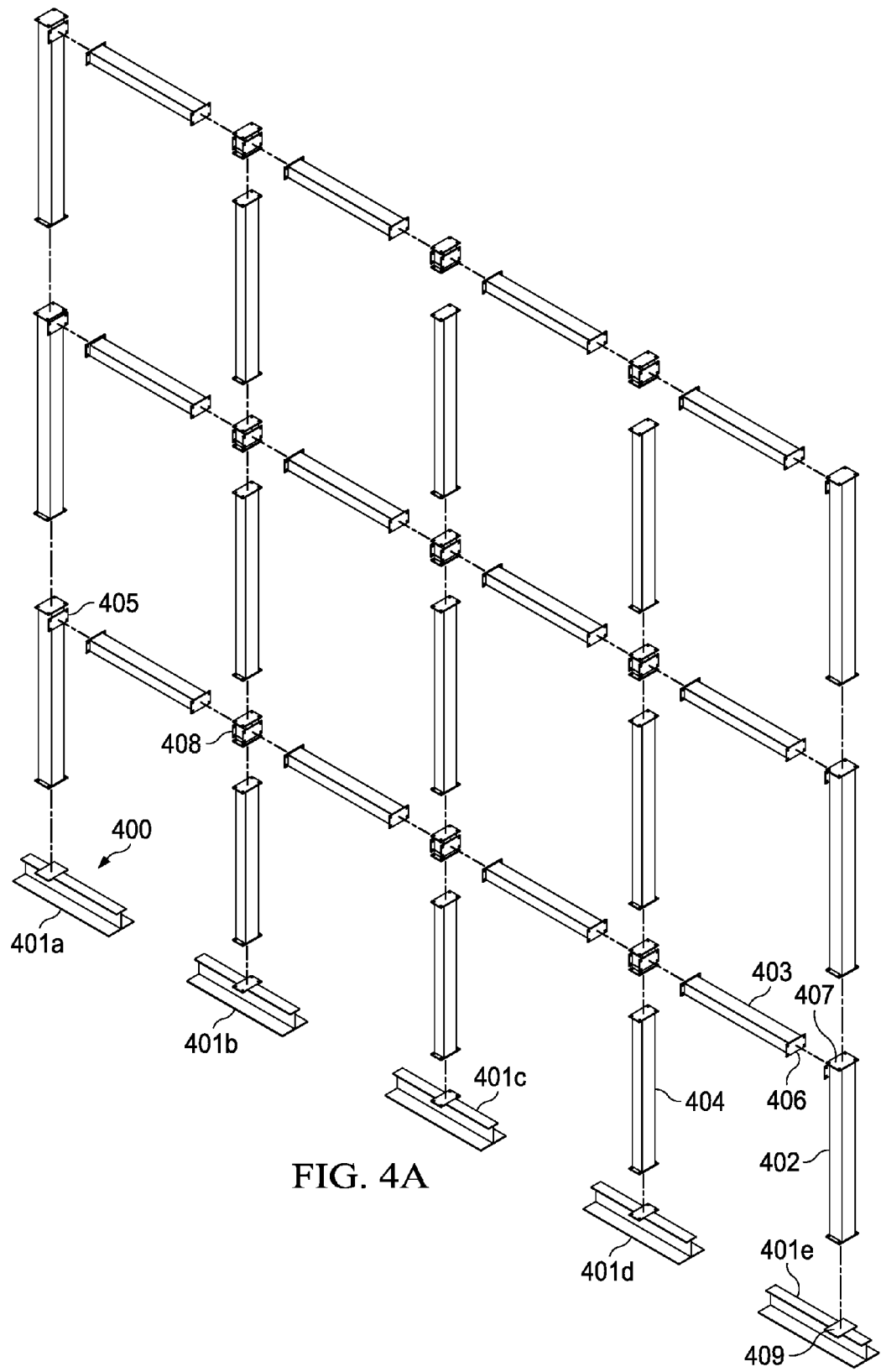
FIG. 4A is an exploded view of one of the two substantially similar middle frames shown in FIG. 2A.

An exploded view of one of the middle frames 203a-203b is provided in FIG. 4A. Each middle frame 203 includes a bottom beam 400, which preferably is formed from steel beam sections 401a-401e, which are fastened together, as well as to the ship deck, using conventional methods such as welding, brazing, or bolting.

Middle frames 203, in the illustrated embodiment, include outer vertical beams 402, horizontal beams 403, and interior vertical beams 404. Preferably, outer vertical beams 402, horizontal beams 403, and interior vertical beams 404 are fabricated from steel.

Outer vertical steel beams 402 bolt together at plates 407 to form columns defining the lateral edges of the given middle frame 203a-203b. Horizontal steel beams 403 define the top and bottom of each subframe 201 in the array of subframes 201 defined by the middle frame 203.

Plates 406 on horizontal beams 403 bolt to plates 405 on outer vertical beams 402. Interior vertical beams 404 and horizontal beams 403 bolt together through steel crosses 408 to form the array of subframes 201. Plates 409 allow outer vertical beams 402 and interior vertical beams 404 to be bolted to beam sections 401a-401e of bottom beam 400.

As with end frames 202, in the preferred embodiment of wind turbine blade pack 200, the various structures forming the assemblies of middle frames (e.g., outer vertical beams 402, horizontal beams 403, and interior vertical beams 404) are fastened together with bolts or similar removal fastening devices, which advantageously allows middle frames 203 to be quickly assembled and disassembled for use, movement, and storage. In alternate embodiments, middle frames 203 may also be assembled using other techniques such as welding, brazing, or the like.

Figure 4B:
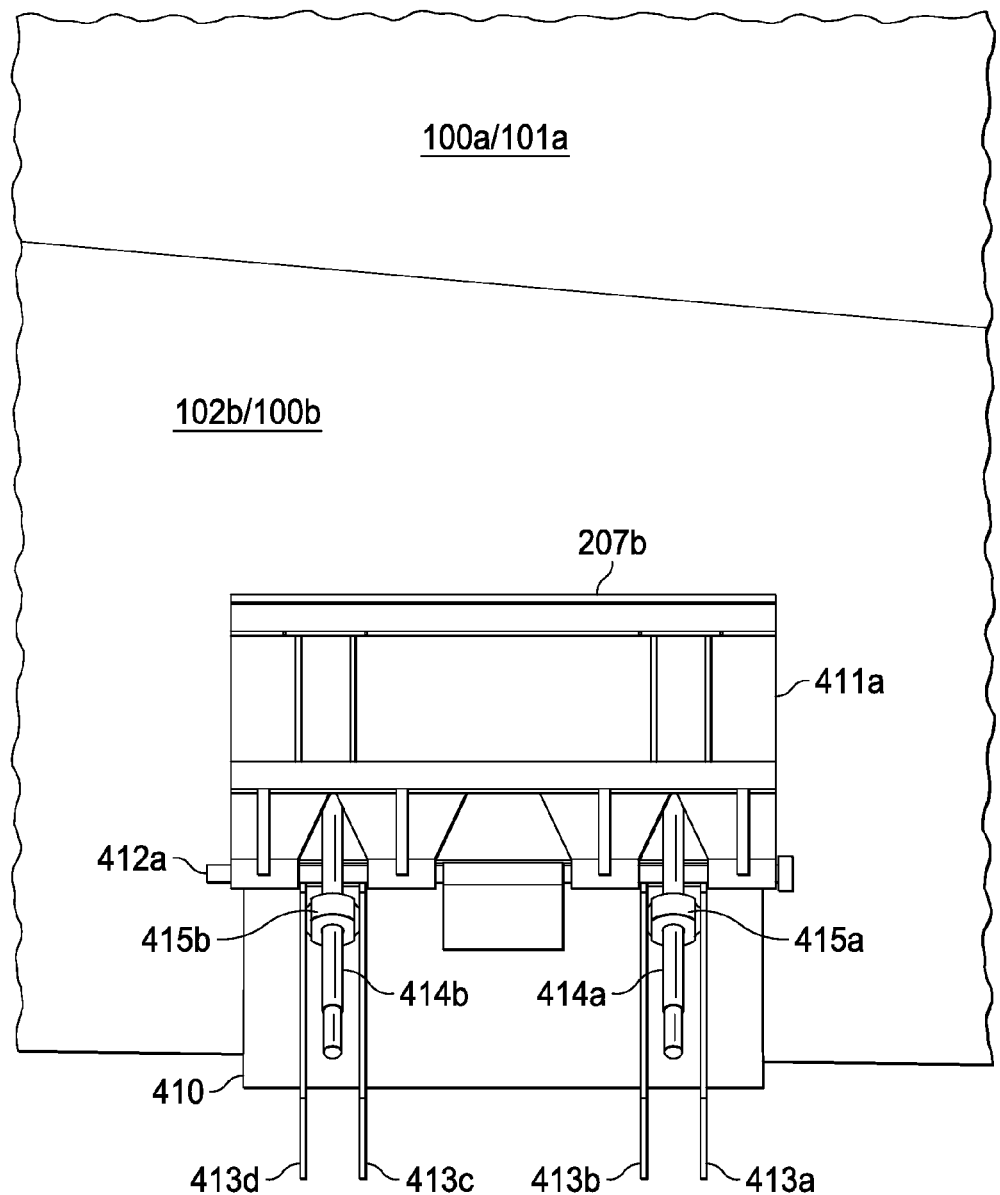
FIG. 4B is a side plan view showing one of the substantially similar wind turbine blade tip section support structures of FIGS. 2C and 2D in further detail, as supporting a corresponding wind turbine blade tip section.

FIG. 4B is a side elevational view of one of two symmetrical sides of a representative blade tip support assembly 207, in this example, blade tip support assembly 207b supporting and stabilizing the reinforced tip section 103 of wind turbine blade 100b (see FIG. 2D). A corresponding exploded view is shown in FIG. 4C.

Each blade tip support assembly 207 includes a steel U-shaped receptacle 410, which is adapted to receive the edge of the reinforced tip section 103 of the corresponding wind turbine blade 100. U-shaped receptacle 410 is supported by steel U-shaped ribs 413a-413d and a steel U-shaped liner 417.

A pair of opposing flaps 411a-411b extend from the upper edges of U-shaped receptacle 410 and are supported by support structures 418a-418b. Raps 411a-411b and support structures 418a-418b rotate around a corresponding pair of hinges formed by shafts 412a-412b, tubes 416a-416b, and tubes 420a-420b. In particular, shafts 412a-412b rotate within tubes 416a-416b, which are disposed along the upper edges of an U-shaped liner 417 and U-shaped ribs 413a-413d. Tubes 420a-420b are fastened to the lower edges of flap support structures 418a-418b and rotate along with shafts 412a-412b.

Flaps 411a-411b pivot in response to torque applied to threaded screws 414a-414d. In the illustrated embodiment, flap 411a pivots in response to torque applied to threaded screws 414a and 414b, which respectively move through the threaded bores of nuts 415a and 415b supported by slots formed in the ends of U-shaped ribs 413a-413d (see FIGS. 4B and 4C). Similarly, flap 411b pivots in response to torque applied to threaded screws 414c and 414d, which respectively move through the threaded bores of nuts 415c and 415d supported by slots formed in the opposite ends of U-shaped ribs 413a-413d).

Bolt holes 419 though the lower portions of ribs 413a-413d allow blade tip support assembly 207 to be bolted to the underlying horizontal steep beam 403 of the corresponding subframe 201.

Figure 4D:
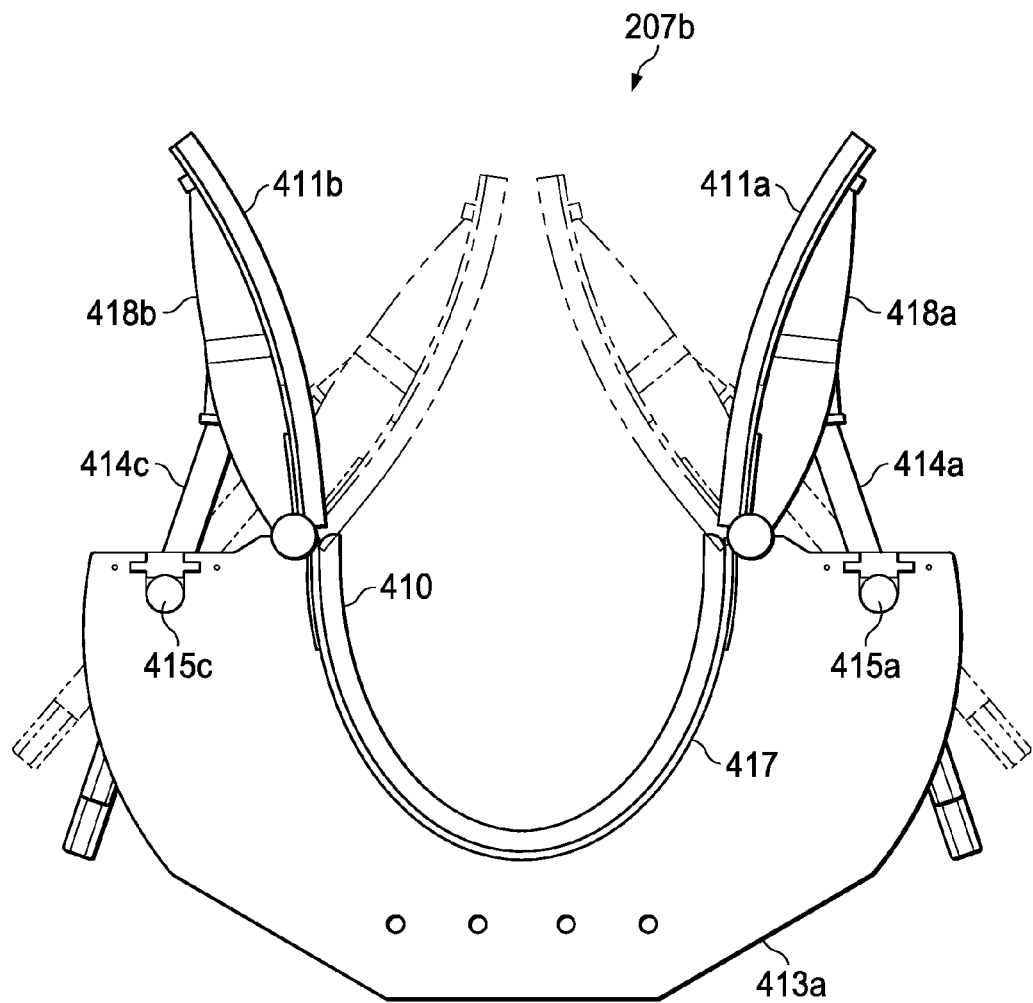
FIG. 4D is an end plan view of one end the wind turbine blade tip section support structure shown in FIG. 4A in an open state.

FIG. 4D is a end plan view of representative blade tip support assembly 207a in the open position, which allows edge of the associated reinforced turbine blade tip section 103 to be inserted and removed from U-shaped receptacle 410. In the open position, flaps 411a and 411b have been retracted using threaded screws 414a-414b.

Figure 4E:
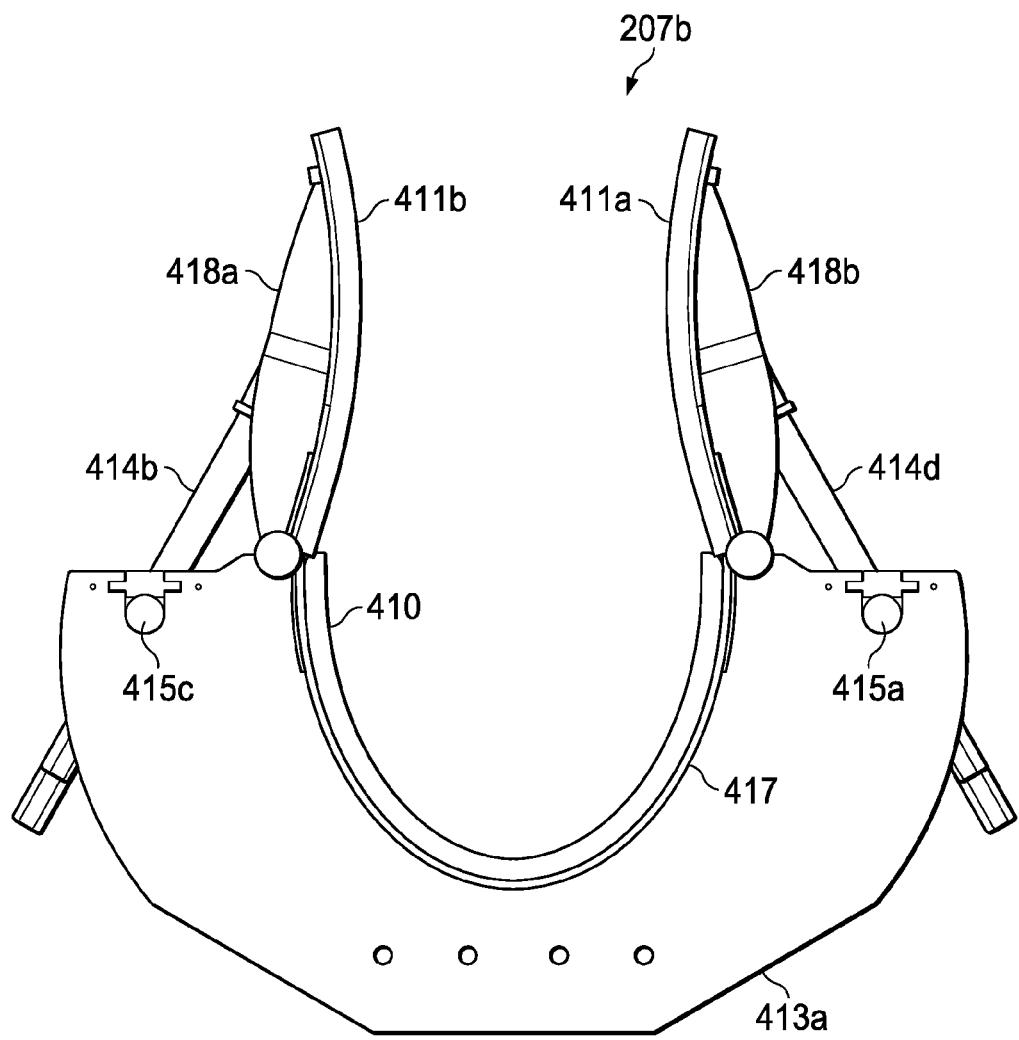
FIG. 4E is an end plan view of the opposing end of the wind turbine blade tip section support structure shown in FIG. 4A, in a closed state.

FIG. 4E is a end plan view of the opposing end of representative blade tip support assembly 207a in the closed position, which allows flaps 411a-411b to contact corresponding surfaces of the corresponding reinforced turbine blade tip section 103 and retain and stabilize that reinforced turbine blade tip section 103 within U-shaped receptacle 410. (The wind turbine blade tip section 103 is not shown in FIG. 4E for clarity.) In the closed position, flaps 411a and 411b have contracted towards the surfaces of the wind turbine blade using threaded screws 414a-414b.

In use, wind turbine blade pack 200 is assembled as it is being loaded with wind turbine blades 100. Generally, the bottom steel beams 300 of end frames 202a-202b and (FIG. 3A). The vertical beams 303 and 305 for the lowest row of the array subframes 201 are fastened to bottom steel beams 300 of each end frame 202a-202b (FIG. 3B). The blade root support assemblies 301 are fastened to vertical beams 303 and 305 for each subframe 201 in the row (FIG. 3C).

Similarly, the lower steel beams 400 of middle frames 203a-203b are fastened to the ship deck and vertical steel beams 402 and 404 for the lowest row of the array of subframes 201 are fastened to bottom steel beams 400 (FIGURES. Blade tip support assemblies 207 are fastened to bottom steel beams 400 of middle frames 203a-203b for the lowest row.

The wind turbine blades 100 are then loaded into the lowest row in the arrays of subframes 201. The cylindrical root section 101 of each blade is lowered onto strap 311 of the corresponding root support assembly 301 while the reinforced blade tip section 103 is lowered into U-shaped receptacle 410 of the corresponding blade tip support assembly 207. The cylindrical root section 101 of each blade is bolted into the corresponding blade root support assembly 301 through ears 312a-312b(FIG. 3D). Straps 313 are disposed around the periphery of each cylindrical root section 100 and fastened to the bottom steel beam 300 of the corresponding end frame 202 (FIG. 3D). Flaps 411a-411b for each blade tip support assembly 207 are then retracted into contact with the surfaces of the corresponding reinforced blade tip section 104 (FIG. 4E). After the lowest row in the arrays of subframes 201 are loaded and the wind turbine blades secured, the horizontal beams 303 of end frames of 202a-202b (FIG. 3B) and the horizontal beams 403 of middle frames 203a-203b (FIG. 4A) are fastened into place.

This process of assembling and loading wind turbine blade pack 200 repeats for each subsequent vertically adjacent row of subframes 201 until the entire m row by n column array of subframes 201 is assembled and loaded. Fastening devices 204 secure and stabilize the entire loaded assemble to the ship deck.

Wind turbine blade packs embodying the principles of the present invention realize substantial advantages over the prior art. Among other things, by packing the wind turbine blades with their edges disposed vertically, not only is the packing density increased, but the wind turbine blades are now in a position better suited to withstand the forces applied during a typical sea journey. In addition, the stability provide by the structure of the wind turbine blade pack allows for a substantial reduction in the number of cables, chains, and composite fiber lines that are required to secure and stabilize each wind turbine blade to the ship deck.

Moreover, the use of wind turbine blade packs according to the present principles reduces or eliminates the need for the fixtures normally required for transporting wind turbine blades. In turn the expenses incurred from lost or discarded fixture components is advantageously reduced.

Furthermore, the embodiments of the present invention are modular and scalable. By varying the distances between end and middle frames, wind turbine blades having different lengths and/or having reinforced tip sections in different locations can be accommodated. Different arrays of subframes can be assembled as needed to transport a particular number of wind turbine blades and/or to meet constraints such as limitation on the deck or hold space available. When not in use transporting wind turbine blades, the structural components of the wind turbine packs can be disassembled for transportation and storage in a standard air-sea transportation container.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A system for transporting wind turbine blades, comprising:
   a first support structure for supporting a cylindrical root section of a first wind turbine blade, the first support structure comprising a frame and a root support assembly including:
      a strap supported by the frame for disposition below the cylindrical root section of the first wind turbine blade; and
      at least one ear supported by the frame and having apertures for receiving bolts for securing the cylindrical root section of the first wind turbine blade;
   a second support structure aligned with and spaced from the first support structure for supporting a tip section of the first wind turbine blade;
   a third support structure for supporting a tip section of a second wind turbine blade; and
   a fourth support structure spaced from and aligned with the third support structure for supporting a cylindrical root section of the second wind turbine blade, wherein the first and second wind turbine blades extend with an edge-vertical orientation in opposing directions such that a tip of the first wind turbine blade is disposed adjacent the cylindrical root section of the second wind turbine blade and a tip of the second wind turbine blade is disposed adjacent the cylindrical root section of the first wind turbine blade.

2. The system of claim 1, wherein:
   the first support structure comprises a selected one of an array of subframes of a first end frame, each subframe of the array of subframes of the first end frame for supporting a cylindrical root section of a wind turbine blade;
   the second support structure comprises a selected one of an array of subframes of a first middle frame, each subframe of the array of subframes of the first middle frame aligned with a corresponding subframe of the array of subframes of the first end frame for supporting, in an edge-vertical orientation, a tip section of a wind turbine having a cylindrical root section supported by the corresponding subframe of the first end frame;
   the third support structure comprises a selected one of an array of subframes of a second middle frame, each subframe of the array of subframes of the second middle frame for supporting a tip section of a wind turbine blade in an edge-vertical orientation; and
   the fourth support structure comprises a selected one of an array of subframes of a second end frame, each subframe of the array of subframes of the second end frame aligned with a corresponding subframe of the array of subframes of the second middle frame for supporting a cylindrical root section of a wind turbine blade having a tip section supported by the corresponding subframe of the second middle frame.

3. The system of claim 1, wherein the third and fourth support structures support such that the tip of the first wind turbine blade is disposed underneath the cylindrical root section of the second wind turbine blade and the tip of the second wind turbine blade is disposed underneath the cylindrical root section of the first wind turbine blade.

4. The system of claim 1, wherein the root support structure further comprises another strap for disposition around an outer surface of the cylindrical root section of the first wind turbine blade and adapted to be fastened to the frame for securing the cylindrical root section of the first turbine blade.

5. The system of claim 1, wherein the second support structure comprises a frame and a root support assembly, the root support assembly comprising:
   a strap supported by the frame for disposition below the cylindrical root section of the second wind turbine blade; and
   at least one ear supported by the frame and having apertures for receiving bolts for securing the cylindrical root section of the second wind turbine blade.

6. The system of claim 5, wherein the root support structure further comprises another strap for disposition around an outer surface of the cylindrical root section of the second wind turbine blade and adapted to be fastened to the frame for securing the cylindrical root section of the second turbine blade.

7. A system for transporting wind turbine blades, comprising:
   a first support structure for supporting a cylindrical root section of a first wind turbine blade;
   a second support structure aligned with and spaced from the first support structure for supporting a tip section of the first wind turbine blade, wherein the second support structure comprises a tip section support assembly for supporting the tip section of the first wind turbine blade in an edge-vertical orientation, the tip section support assembly comprising:
      a U-shaped receptacle for receiving an edge of the tip section of the first wind turbine blade;
      first and second opposing pivoting flaps extending from corresponding first and second opposing edges of the U-shaped receptacle for contracting against opposing surfaces of the tip section of the first wind turbine blade;
   a third support structure for supporting a tip section of a second wind turbine blade; and
   a fourth support structure spaced from and aligned with the third support structure for supporting a cylindrical root section of the second wind turbine blade, wherein the first and second wind turbine blades extend with the edge-vertical orientation in opposing directions such that a tip of the first wind turbine blade is disposed adjacent the cylindrical root section of the second wind turbine blade and a tip of the second wind turbine blade is disposed adjacent the cylindrical root section of the first wind turbine blade.

8. The system of claim 7, wherein the tip section support assembly further comprises:
   a first hinge assembly pivotally coupling the first flap with the first edge of the U-shaped receptacle;
   a first threaded screw and threaded nut assembly for applying force to pivot the first flap around the first hinge assembly;
   a second hinge assembly pivotally coupling the second flap with the second edge of the U-shaped receptacle; and
   a second threaded screw and threaded nut assembly for applying force to pivot the second flap around the first hinge assembly.

9. The system of claim 7, wherein the third support structure comprises a tip section support assembly for supporting the tip section of the second wind turbine blade in the edge-vertical orientation, the tip section support assembly comprising:
  a U-shaped receptacle for receiving an edge of the tip section of the second wind turbine blade; and
  first and second opposing pivoting flaps extending from corresponding first and second opposing edges of the U-shaped receptacle for contracting against opposing surfaces of the tip section of the second wind turbine blade.

10. The system of claim 9, wherein the tip section support assembly of the third support structure further comprises:
  a first hinge assembly pivotally coupling the first flap with the first edge of the U-shaped receptacle;
  a first threaded screw and threaded nut assembly for applying force to pivot the first flap around the first hinge assembly;
  a second hinge assembly pivotally coupling the second flap with the second edge of the U-shaped receptacle; and
  a second threaded screw and threaded nut assembly for applying force to pivot the second flap around the first hinge assembly.

11. A wind turbine transportation pack comprising:
  a first end frame comprising a plurality of subframes each for supporting a cylindrical root section of a wind turbine blade disposed in an edge-vertical orientation;
  a first middle frame comprising a plurality of subframes, each subframe of the middle frame spaced from and aligned with a corresponding subframe of the first end frame and adapted to support a tip section of a wind turbine blade having a cylindrical root section supported by the corresponding subframe of the first end frame;
  a second end frame comprising a plurality of subframes each for supporting a cylindrical root section of a wind turbine blade disposed in an edge-vertical orientation;
  second middle frame comprising a plurality of subframes, each subframe of the second middle frame spaced from and aligned with a corresponding subframe of the second end frame and adapted to support a tip section of a wind turbine blade having a cylindrical root section supported by the corresponding subframe of the second end frame;
  wherein each of the plurality of subframes of the first and second middle frames comprises a tip section support assembly for supporting the tip section of a corresponding wind turbine blade in the edge-vertical orientation, the tip section support assembly cornprisinq:
    a U-shaped receptacle for receiving an edge of the tip section of the corresponding wind turbine blade; and
    first and second opposing pivoting flaps extending from corresponding first and second opposing edges of the U-shaped receptacle for contracting against opposing surfaces of the tip section of the corresponding wind turbine blade; and
  wherein a selected pair of horizontally adjacent wind turbine blades extend through a corresponding pair of aligned subframes of the first and second middle frames in opposing directions such that a tip of a first wind turbine blade of the pair is disposed adjacent the cylindrical root section of a second wind turbine blade of the pair and a tip of the second wind turbine blade of the pair is disposed adjacent the cylindrical root section of the first wind turbine blade of the pair.

12. The wind turbine transportation pack of claim 11, wherein each of the plurality of subframes of each of the first and second end frames support assembly include:
  a strap supported by the subframe for disposition below the cylindrical root section of a corresponding wind turbine blade; and
  at least one ear supported by the subframe and having apertures for receiving bolts for securing the cylindrical root section of the corresponding wind turbine blade.

13. The system of claim 12, wherein the root support structure further comprises another strap for disposition around an outer surface of the cylindrical root section of the corresponding wind turbine blade and adapted to be fastened to the subframe for securing the cylindrical root section of the corresponding turbine blade.

14. The system of claim 11, wherein the tip section support assembly further comprises:
  a first hinge assembly pivotally coupling the first flap with the first edge of the U-shaped receptacle;
  a first assembly for applying force to pivot the first flap around the first hinge assembly;
  a second hinge assembly pivotally coupling the second flap with the second edge of the U-shaped receptacle; and
  a second assembly for applying force to pivot the second flap around the first hinge assembly.

15. The system of claim 11, wherein the selected pair of horizontally adjacent wind turbine blades extend through the corresponding pair of aligned subframes of the first and second middle frames in opposing directions such that the tip of a first wind turbine blade of the pair is disposed underneath the cylindrical root section of the second wind turbine blade of the pair and the tip of the second wind turbine blade of the pair is disposed underneath the cylindrical root section of the first wind turbine blade of the pair.

16. The system of claim 14, wherein at least one of the first and second assemblies for applying force comprises a threaded screw extending through a threaded nut.

17. A wind turbine blade pack for transporting wind turbine blades, comprising:
  a first subframe array having subframe; and
  a first blade root support assembly supported by the subframe of the first subframe array for securing a cylindrical root section of a first wind turbine blade;
  a second subframe array having a subframe spaced from and aligned with the subframe of the first subframe array;
  a first blade tip section support assembly supported by the subframe of the second subframe array for securing a blade tip section of the first wind turbine blade in an edge-vertical orientation;
  a third subframe array having subframe; and
  a second blade root support assembly supported by the subframe of the third subframe array for supporting and securing a cylindrical root section of a second wind turbine blade;
  a fourth subframe array having a subframe spaced from and aligned with the subframe of the third subframe array; and
  a second blade tip section support assembly supported by the subframe of the fourth subframe array for securing a blade tip section of the second wind turbine blade in an edge-vertical orientation;
  wherein each tip section support assembly comprises:
    a U-shaped receptacle for receiving an edge of the tip section of a corresponding one of the first and second wind turbine blades;

first and second opposing pivoting flaps extending from corresponding first and second opposing edges of the U-shaped receptacle for contracting against opposing surfaces of the tip section of the corresponding wind turbine blade;

a first hinge assembly pivotally coupling the first flap with the first edge of the U-shaped receptacle;

a first assembly for applying force to pivot the first flap around the first hinge assembly;

a second hinge assembly pivotally coupling the second flap with the second edge of the U-shaped receptacle; and a second assembly for applying force to pivot the second flap around the first hinge assembly; and wherein the first and second wind turbine blades extend in opposing directions through the subframes of the second and third subframe arrays such that a tip of the first wind turbine blade is disposed underneath the cylindrical root section of the second wind turbine blade and a tip of the second wind turbine blade is disposed underneath the cylindrical root section of the first wind turbine blade.

18. The wind turbine blade pack of claim 17, wherein each of the first, second, third, and fourth subframe arrays each comprises an array of m number of rows and n number of columns of subarrays for transporting up to n×m×2 number of wind turbine blades.

19. The wind turbine blade pack of claim 17, wherein each of the first and second blade root support assemblies comprises:

a strap supported by the subframe for disposition below a cylindrical root section of a corresponding one of the first and second wind turbine blades;

at least one ear supported by the subframe and having apertures for receiving bolts for securing the cylindrical root section of the corresponding wind turbine blade; and another strap for disposition around an outer surface of the cylindrical root section of the corresponding wind turbine blade and adapted to be secured to the subframe.

20. A system for transporting wind turbine blades, comprising:

a first support structure for supporting a cylindrical root section of a first wind turbine blade;

a second support structure aligned with and spaced from the first support structure for supporting a tip section of the first wind turbine blade, wherein the second support structure comprises a tip section support assembly for supporting the tip section edge of the first wind turbine blade in the edge-vertical orientation, the tip section support assembly comprising:

a U-shaped receptacle for receiving an edge of the tip section of the first wind turbine blade;

first and second opposing flaps extending from corresponding first and second opposing edges of the U-shaped receptacle for respectively contacting first and second opposing surfaces of the tip section of the first wind turbine blade, wherein the first flap pivots for contracting against the first surface of the tip section of the first wind turbine blade;

a third support structure for supporting a tip section of a second wind turbine blade; and a fourth support structure spaced from and aligned with the third support structure for supporting a cylindrical root section of the second wind turbine blade, wherein the first and second wind turbine blades extend with an edge-vertical orientation in opposing directions such that a tip of the first wind turbine blade is disposed adjacent the cylindrical root section of the second wind turbine blade and a tip of the second wind turbine blade is disposed adjacent the cylindrical root section of the first wind turbine blade.

21. The system of claim 20, wherein the tip section support assembly further comprises:

a first hinge assembly pivotally coupling the first flap with the first edge of the U-shaped receptacle; and a first threaded screw and threaded nut assembly for applying force to pivot the first flap around the first hinge assembly.

22. The system of claim 20, wherein the second flap pivots for contracting against the second surface of the tip section of the first wind turbine blade.

23. The system of claim 20, wherein the tip section support assembly further comprises:

a second hinge assembly pivotally coupling the second flap with the second edge of the U-shaped receptacle; and a second threaded screw and threaded nut assembly for applying force to pivot the second flap around the first hinge assembly.

24. The system of claim 20, wherein the third support structure comprises a tip section support assembly for supporting the tip section of the second wind turbine blade in the edge-vertical orientation, the tip section support assembly comprising:

a U-shaped receptacle for receiving an edge of the tip section of the second wind turbine blade;

first and second opposing flaps extending from corresponding first and second opposing edges of the U-shaped receptacle for respectively contacting first and second opposing surfaces of the tip section of the second wind turbine blade, wherein the first flap pivots for contracting against the first surface of the tip section of the second wind turbine blade.

25. The system of claim 24, wherein the tip section support assembly of the third support structure further comprises:

a first hinge assembly pivotally coupling the first flap with the first edge of the U-shaped receptacle; and a first threaded screw and threaded nut assembly for applying force to pivot the first flap around the first hinge assembly.

26. The system of claim 20, wherein the second flap of the tip support assembly of the third support structure pivots for contracting against the second surface of the second wind turbine blade.

27. The system of claim 26, wherein the tip support assembly of the third support structure further comprises:

a second hinge assembly pivotally coupling the second flap with the second edge of the U-shaped receptacle; and a second threaded screw and threaded nut assembly for applying force to pivot the second flap around the first hinge assembly.

* * * * *